Jan. 5, 1937.    A. C. DURDIN, JR    2,067,161
SEWAGE TREATMENT APPARATUS
Filed Dec. 21, 1934
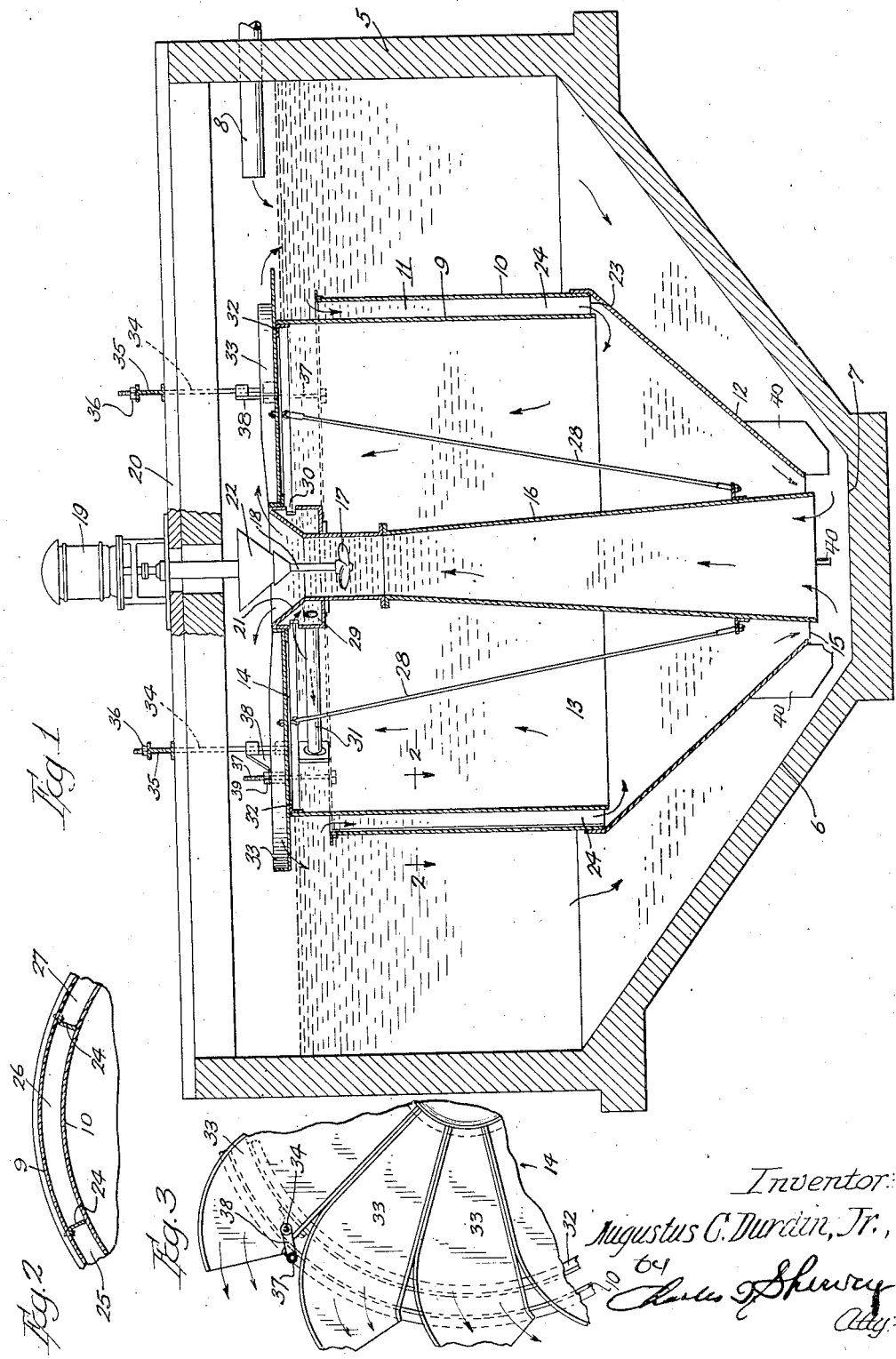
Inventor:
Augustus C. Durdin, Jr., Patented Jan. 5, 1937

2,067,161

UNITED STATES PATENT OFFICE 2,067,161

SEWAGE TREATMENT APPARATUS

Augustus C. Durdin, Jr., Niles Center, Ill., assignor to Chicago Pump Company, Chicago, Ill., a corporation of Illinois Application December 21, 1934, Serial No. 758,630

14 Claims. (Cl. 210—8)

This invention relates to sewage treatment apparatus preferably of the kind in which the sewage is aerated, circulated in an aerating tank and in some cases subjected to the biological action of aerobic bacteria, and thereafter conducted to a settling chamber wherein the sludge is permitted to settle, and the effluent is discharged from the top thereof. The principal object of the present invention is to provide a closed passageway or passageways between the aerating tank and the settling chamber through which the aerating mix may move slowly from the aerating tank to the settling chamber, whereby the contents of the settling chamber will not be agitated by the incoming mixture, thereby facilitating the settling of the sludge.

Ordinarily the aerating mix in the tank is in a more or less turbulent condition, and sometimes this condition is accelerated because the aerating mix is discharged into the contents of the aerating tank, in a tangential direction which imparts a circular movement to the aerating mix in the tank. One object of the present invention is to separate the circulating aerating mix from that contained in the settling chamber, and to conduct the aerating mix from the tank to the settling chamber through one or more passageways whereby the turbulent condition of the aerating mix is arrested and it is caused to flow slowly into the settling chamber without disturbing or agitating the contents thereof in order that the sludge may settle down therefrom and be recirculated.

Other objects and advantages will appear in the course of this specification and with all of said objects and advantages in view, this invention consists in the several novel features hereinafter fully set forth and claimed.

One embodiment of the invention is illustrated in the drawing accompanying this specification, in which:

Fig. 1 is a central vertical section through sewage treatment apparatus forming the subject matter of this specification;

Fig. 2 is a fragmental horizontal section taken on the line 2—2 of Fig. 1; and

Fig. 3 is a plan of a fragment of a certain platform ordinarily used in the apparatus.

Referring to said drawing, the reference character 5 designates an aerating tank, having a hopper like bottom 6 desirably formed with a flat bottom 7 at its apex portion. The tank may be of polygonal or circular form as desired. A sewage influent conduit 8 enters the tank near its upper end and discharges the sewage thereinto.

Associated with the tank, and desirably supported in the middle thereof, is a continuous wall 9, preferably cylindrical, and surrounding said wall is a second continuous or cylindrical wall 10, the two walls being spaced to provide a passageway 11 therebetween, open at the top and bottom. From the bottom of the outer wall 10, a wall 12 of conical or pyramidal form, extends down towards the bottom 7 of the tank. The walls 9 and 12 provide a settling chamber 13 closed at the top by a cover, disposed above or below the level of the aerating mix, and here shown in the form of a splash platform 14. The settling chamber has an opening 15 at its lower end through which sludge may settle out from the settling chamber 13 into the space therebelow. An upright conduit 16, axially disposed with respect to the settling chamber, is supported as by stay bolts 28, with its open lower end disposed at a suitable distance above the bottom 7 of the tank. In the upper end of the conduit 16 is an aerator or propeller 17, which is mounted upon a shaft 18 connected to and driven, by an electric motor or other prime mover 19, mounted upon a bridge or structural element 20 carried by the upper end of the tank. Desirably the upper end of the conduit 16 flares outwardly and in some cases an inverted cone shaped body 22 is mounted upon the shaft 18 for deflecting the aerating mix outward upon the platform 14, or into the contents of the tank when the platform is not used. The aerator 17 may take various forms and it operates to propel the aerating mix in the conduit 16 upward and discharge it therefrom.

The upper end of the outer wall 10 is located below the level of the aerating mix contained in the tank, thereby providing an inlet to the passageway 11 at its upper end for the admission of the aerating mix to the passageway. The lower end of the passageway 11 is open at 23 thereby providing an outlet opening from the passageway 11 to the settling chamber 13. In order to prevent any surging or circular movement of the aerating mix, when passing through the passageway 11 to the settling chamber 13, a number of upright cross-walls 24 extend between the walls 9, 10 and divide the passageway 11 into the number of separate upright passages 25, 26, 27 (see Fig. 2). The cross-walls 24 not only act as baffles for preventing movement of the aerating mix around the passageway 11, but they serve to properly space apart the two walls 9, 10.

In the upper end of the settling chamber is an effluent channel 29 having inlet openings 30 in its side wall through which the effluent may enter the channel 29, and leading from said channel is an effluent conduit 31 which extends through the wall 9 and out through the side wall of the tank 5, and conducts the effluent away from the plant. In the embodiment of the invention illustrated, the effluent channel 29 is of annular form surrounding the upper end of the conduit 16, and is located below the level of the aerating mix in the tank, whereby there may be a continuous flow from the tank down through the passageway, up through the settling chamber and out through the effluent channel and conduit.

When a splash platform is used, it is usually composed of structural framework 32, upon which are supported a number of radially extending pans 33 which desirably are arranged to discharge the aerating mix in a tangential direction into the contents of the tank. Fig. 3 illustrates a form of pan which discharges the aerating mix tangentially from the platform. It is to be understood, however, that the exact form of platform illustrated is not essential to the invention broadly considered, and that it may be in the form of a cover for the settling chamber. Baffles 40 are placed around the inlet to the conduit to retard the circular movement of the aerating mix before entering the conduit.

The platform or other cover for the settling chamber may be supported from the bridge structure 20 by rods 34 fastened to the platform or cover and supported by I beams 35 carried by the bridge structure. Nuts 36 threaded upon the upper ends of the rods 34 provide means whereby the platform or cover and all parts carried thereby may be raised or lowered. Adjustment means are also provided for raising and lowering the outer wall 10 and the conical wall 12. As shown, said means comprise threaded rods 37 connected to the top of the wall 10 and extending through and supported upon brackets 38 by nuts 39. The brackets 38 project from the platform and may be carried by the rods 34. The stay bolts 28, which support the conduit 16, are connected to the platform at their upper ends. With the adjustment means above described, the platform and the various walls associated with the settling chamber and the conduit 16 may be raised or lowered with respect to the level of the aerating mix in the tank, and the discharge opening in the settling chamber may be adjusted with respect to the inlet opening to the conduit. The desideratum is to cause a slight downward flow in the lower part of the settling chamber, whereby to carry the sludge downward and out through the lower discharge opening therein, so that it may be carried to the upright conduit and be recirculated. By properly locating the discharge opening in the bottom of the settling chamber with respect to the inlet opening to the conduit, a downward flow of the sludge and liquid from the lower part of the settling chamber is caused along with the flow of the aerating mix from the tank, to the inlet of the conduit, as the aerating mix is discharged from the top of the conduit.

In accordance with the usual practice, means are provided for removing excess accumulated sludge from the plant, but as such means are common and well known they are not illustrated. In some instances a sludge discharging pipe may lead from the bottom of the hopper like wall of the tank through which the sludge is discharged when necessary.

In the operation of the apparatus, when used for sewage treatment, sewage is supplied to the tank in a continuous or intermittent stream through the conduit 8, passes through the plant and discharges from the settling chamber through the effluent channel 29 and the effluent conduit 31. The aerator or propeller 17 discharges the aerating mix from the conduit 16 and showers it upon the platform 14 (when one is used) from which it discharges, preferably in a tangential direction, upon the contents of the tank 5, thereby imparting a circular movement to the aerating mix therein. If the platform is dispensed with, the aerator discharges the aerated mix upon the contents of the tank. As the aerating mix is discharged from the conduit 16, aerated mix flows from the bottom of the tank up through the conduit, thereby causing a downward circulation of the aerating mix from top to bottom of the tank, and at the same time sludge flows from the settling chamber to the conduit. Since the settling tank is separated from the surrounding contents of the tank and since the effluent discharges very slowly from the effluent channel, a quiescent zone is maintained in the settling chamber, thereby permitting the sludge therein to settle and escape through the opening 15 in the bottom of the settling chamber, from which it is again carried up through the conduit 16 and recirculated. As the level of the effluent in the effluent channel 29 lowers, aerating mix contained in the tank is permitted to pass into and down the separate passages between the walls 9, 10 and flows slowly into the settling chamber where the liquids slowly rise and the sludge slowly settles down and out as before described.

From the above, it is apparent that regardless of the turbulent condition of the aerating mix in the outer portion of the tank, the movement of the aerating mix down through the separate passages between the walls 9, 10 is slowed down so that upon entering the settling chamber, the incoming mixture does not appreciably disturb the quiescent condition maintained therein.

It is to be observed that the cross-sectional area of the passageway between the tank and settling chamber is many times greater than the cross-sectional area of the effluent conduit. Consequently the movement of the mixture through the passageway is very slow, and the turbulent condition existing in the tank is reduced to a more or less quiescent condition by the time the mixture flows into the settling chamber.

While the invention has been shown and described in connection with a sewage treatment plant, I do not desire to limit myself thereto, as it may be used in other plants where liquids are circulated in the treatment thereof.

By the term "aerating mix" as used in this specification and claims is meant the sewage or other liquids which have become subjected to treatment in the apparatus, and by some persons designated as "mixed liquor."

I claim as new and desire to secure by Letters Patent:

1. Apparatus for the treatment of sewage or other liquids, comprising in combination a tank, a settling chamber having a side wall separating the contents of the tank from that in the settling chamber, whereby a quiescent zone is provided in the settling chamber, there being a restricted discharge opening at the bottom of the settling chamber, and means providing an inlet passageway between the tank and settling chamber for conducting the contents of the tank to the settling chamber, said passageway having an inlet at its top, opening to the tank, and an outlet at its bottom opening to the settling chamber.

2. Apparatus for the treatment of sewage or other liquids, comprising in combination, a tank for receiving the liquid to be treated, a wall providing a settling chamber in said tank, from which the effluent discharges, there being a restricted discharge opening at the bottom of the settling chamber, and a wall paralleling said first mentioned wall and providing therewith an inlet passageway surrounding the settling chamber and having an inlet at its top, opening to the tank, and an outlet located below the inlet, opening to the settling chamber.

3. Apparatus for the treatment of sewage or other liquids, comprising in combination, a tank, means for circulating liquids therein, a settling chamber in the tank having a side wall separating the contents of the tank from contents of the settling chamber, whereby a quiescent zone is provided in the settling chamber, there being an effluent discharge opening at the top of the settling chamber and a restricted discharge opening at the bottom thereof, and means providing an inlet passageway having an inlet, opening to the tank and an outlet, opening to the settling chamber at a considerable distance below the effluent discharge opening.

4. Apparatus for the treatment of sewage or other liquids, comprising in combination, a tank, means for circulating liquids therein, an endless wall in the tank, and a hopper like wall below said endless wall and providing therewith a settling chamber, closed at its top and open at its bottom, there being an effluent discharge opening at the top of the settling chamber, and means providing a passageway located along said endless wall, said passageway having an inlet, opening to the tank and an outlet, opening to the settling chamber, said outlet being located at a considerable distance below the effluent discharge opening.

5. Apparatus for the treatment of sewage or other liquid, comprising in combination, a tank, mechanical means for circulating liquid therein, parallel, spaced endless walls and a hopper like bottom wall extending down from one of said walls, one of said endless walls and the hopper like bottom providing a settling chamber, there being an inlet, opening from the tank to the top of the space between said spaced walls, and an outlet, opening from the bottom of said space to the settling chamber, and there being an opening at the bottom of the hopper like wall.

6. Apparatus for the treatment of sewage or other liquid, comprising in combination, a tank having a hopper like bottom, an upright open ended conduit rising from the lower end of the tank, means at the top of said conduit for circulating liquids in said tank and up the conduit, a settling chamber surrounding the conduit, closed at its top and open at its bottom, and means providing a passageway surrounding said settling chamber, said passageway having an inlet, opening to the tank and an outlet opening to the settling chamber.

7. Apparatus for the treatment of sewage or other liquid, comprising in combination, a tank having an influent conduit, means for circulating liquid in the tank, an endless wall having a funnel like bottom located in the tank and providing a settling chamber therein opening at its lower end to the tank, an endless wall paralleling said first mentioned endless wall and forming a passageway between the walls, opening at the top to the tank and at the bottom to the settling chamber, and cross walls extending between said endless walls and dividing the passageway into individual passages.

8. Apparatus for the treatment of sewage or other liquid, comprising in combination, a tank, means for circulating liquids in said tank, inner and outer spaced parallel endless walls in said tank, forming a passageway between them, open at the top and bottom, the inner wall rising above the level of the liquid in the tank, and the top of the outer wall being located below the level of the liquid, whereby liquid may enter said passageway, and a hopper-like bottom wall extending down from the lower edge of the outer endless wall, said hopper-like bottom wall and the inner endless wall providing a settling chamber separated from the circulating liquid in the tank, and the opening at the bottom of said passageway opening to the settling chamber.

9. Apparatus for the treatment of sewage or other liquid, comprising in combination, a tank, an open ended upright conduit therein, mechanical means for withdrawing liquid from the upper end of the conduit and discharging it upon the liquid contained in the tank, a settling chamber surrounding said conduit, and having side walls separating it from the liquid in the tank, and means providing a closed passageway surrounding the settling chamber, said passageway having an inlet opening to the tank and an outlet opening to the settling chamber.

10. Apparatus for the treatment of sewage or other liquid, comprising a tank, means for circulating liquids therein, including an upright conduit open at the bottom, an endless wall in the tank, providing a settling chamber therein, having a restricted opening in its bottom disposed around the opening in the conduit, and adjustment means for raising and lowering said endless wall to vary the positions of said openings.

11. Apparatus for the treatment of sewage or other liquid, comprising a tank, means for circulating liquid therein, including an upright conduit open at the bottom, a top wall, an inner endless settling chamber enclosing wall carried by said top wall, an outer endless wall spaced from and paralleling said inner endless wall and forming therewith a passageway from the tank to the settling chamber, adjustment means for raising and lowering the top wall and inner endless wall, and adjustment means for independently raising and lowering the outer endless wall.

12. Apparatus for the treatment of sewage or other liquid, comprising a tank, means for circulating liquid in the tank, a platform upon which the sewage is discharged and from which it discharges into the tank, an open ended conduit and a settling chamber wall both carried by the platform, means for raising and lowering the platform and therewith the conduit and wall, a second wall paralleling the first mentioned wall and having a discharge opening at its bottom, and means for raising and lowering the second named wall independently of the other one, said walls providing a passageway between the tank and settling chamber.

13. In apparatus for the treatment of sewage or other liquids, a tank, a conduit, open at the top and bottom and extending up from the bottom of the tank, means for circulating liquid from the bottom of the tank and up through the conduit and discharging it from the top thereof, means for circulating the liquid circumferentially in the tank, a wall providing a settling chamber surrounding the conduit and having a restricted opening at its bottom adjacent the bottom opening to the conduit and means mounted on said wall adjacent said openings in the settling chamber and conduit for resisting circular movement of the liquid adjacent said openings.

14. Apparatus for the treatment of sewage or other liquids, comprising in combination a tank for receiving the liquids to be treated, an influent conduit discharging into the tank, a settling chamber in the tank, closed at the top and having a sludge discharge opening at its bottom, and there being an inlet, opening from the tank to the settling chamber and an effluent conduit leading from the settling chamber, an open ended conduit extending up from the bottom of the tank through the settling chamber and having an inlet opening located adjacent the sludge discharge opening of the settling chamber, and means for circulating the contents of the tank up through the conduit and back into the tank.

AUGUSTUS C. DURDIN, Jr.